United States Patent
Park et al.

(10) Patent No.: US 11,955,604 B2
(45) Date of Patent: Apr. 9, 2024

(54) ELECTROLYTE SOLUTION FOR LITHIUM SECONDARY BATTERY AND LITHIUM SECONDARY BATTERY INCLUDING THE SAME

(71) Applicant: SK ON CO., LTD., Seoul (KR)

(72) Inventors: Ki Sung Park, Daejeon (KR); Chanwoo Kim, Daejeon (KR); Yu Na Shim, Daejeon (KR); Sung Yon Oh, Daejeon (KR)

(73) Assignee: SK ON CO., LTD., Seoul (KR)

( * ) Notice: Subject to any disclaimer, the term of this patent is extended or adjusted under 35 U.S.C. 154(b) by 0 days.

(21) Appl. No.: 18/306,244

(22) Filed: Apr. 25, 2023

(65) Prior Publication Data

US 2023/0352739 A1    Nov. 2, 2023

(30) Foreign Application Priority Data

Apr. 27, 2022 (KR) .................. 10-2022-0052238

(51) Int. Cl.
*H01M 10/0567* (2010.01)
*H01M 10/0525* (2010.01)
*H01M 10/0569* (2010.01)

(52) U.S. Cl.
CPC ... *H01M 10/0567* (2013.01); *H01M 10/0525* (2013.01); *H01M 10/0569* (2013.01); *H01M 2300/0037* (2013.01); *H01M 2300/004* (2013.01)

(58) Field of Classification Search
None
See application file for complete search history.

(56) References Cited

U.S. PATENT DOCUMENTS

2013/0029217 A1 * 1/2013 Bhat ................ H01M 10/0567
429/188

FOREIGN PATENT DOCUMENTS

| JP | 2011-086548 | * | 4/2011 |
|---|---|---|---|
| KR | 10-2019-0119615 A | | 10/2019 |
| KR | 10-2021-0011427 A | | 2/2021 |
| KR | 10-2021-0026500 A | | 3/2021 |
| WO | 2020/047674 A1 | | 3/2020 |

OTHER PUBLICATIONS

Lermontov et al. "1-Fluorosilatrane synthesis from SiF4 complexes and its properties"; Journal of Organometallic Chemistry, vol. 694 (2009), pp. 2476-2479.*
Broka et al. "Electrochemical oxidation of silatranes"; J. Electroanal. Chem, 1993, vol. 351, pp. 199-206.*
Hiroyuki Yamaguchi et al., Lithium Tetrakis(haloacyloxy)borate: An Easily Soluble and Electrochemically Stable Electrolyte for Lithium Batteries, Journal of The Electrochemical Society, Jan. 31, 2003, 150 (3), pp. A312-A315.
Extended European Search Report on the European Patent Application No. 23169868.9 issued by the European Patent Office dated Sep. 5, 2023.
Mizumo Tomonobu et al., Oligosiloxanes with Silatrane Moieties for Use in Lithium-ion Conductive Matrices, Silicon, Nov. 21, 2014, pp. 85-96, vol. 9, No. 1.
Broka et al., Electrochemical oxidation of silatranes, Journal of Electroanalytical Chemistry and Interfacial Electrochemistry, Jun. 1, 1993, pp. 199-206, vol. 351, No. 1-2.
Lermontov et al., 1-Fluorosilatrane synthesis from SiF4 complexes and its properties, Journal of Organometallic Chemistry, Jul. 15, 2009, pp. 2476-2479, vol. 694, No. 16.
Sidorkin et al., "Electrochemical Oxidation and Radical Cations of Structurally Non-rigid Hypervalent Silatranes: Theoretical and Experimental Studies", Chemistry—A European Journal, Jan. 2, 2017, pp. 1910-1919, vol. 23, No. 8.
Yamaguchi et al., Lithium Tetrakis(haloacyloxy)borate: An Easily Soluble and Electrochemically Stable Electrolyte for Lithium Batteries, Journal of the Electrochemical Society, Jan. 1, 2003, pp. A312-A315, vol. 150, No. 3.

* cited by examiner

Primary Examiner — Laura Weiner
(74) Attorney, Agent, or Firm — IP & T GROUP LLP

(57) ABSTRACT

An electrolyte solution for a lithium secondary battery according to an embodiment of the present invention includes an organic solvent, a lithium salt, a compound represented by Chemical Formula 1, and a compound represented by Chemical Formula 2. A lithium secondary battery including the electrolyte solution and having improved low temperature and high temperature properties is provided.

10 Claims, 1 Drawing Sheet

ELECTROLYTE SOLUTION FOR LITHIUM SECONDARY BATTERY AND LITHIUM SECONDARY BATTERY INCLUDING THE SAME

CROSS-REFERENCE TO RELATED APPLICATION AND CLAIM OF PRIORITY

This application claims priority to Korean Patent Applications No. 10-2022-0052238 filed on Apr. 27, 2022 in the Korean Intellectual Property Office (KIPO), the entire disclosure of which is incorporated by reference herein.

BACKGROUND

1. Field

The present invention relates to an electrolyte solution for a secondary battery and a lithium secondary battery including the same. More particularly, the present invention relates to an electrolyte solution for a lithium secondary battery including an organic solvent and a lithium salt, and a lithium secondary battery including the same.

2. Description of the Related Art

A secondary battery which can be charged and discharged repeatedly has been widely employed as a power source of a mobile electronic device such as a mobile phone, a laptop computer, etc.

Particularly, a lithium secondary battery is advantageous from aspects of an operational voltage, an energy density, a high charging rate, a compact dimension, etc. Accordingly, the lithium secondary battery is also employed as a power source for an electric vehicle.

The lithium secondary battery may include an anode including an anode active material (e.g., graphite), a cathode including a cathode active material (e.g., lithium metal oxide particles), and a non-aqueous electrolyte solution including a lithium salt and an organic solvent.

As the lithium secondary battery is repeatedly charged and discharged, structural deformation of the lithium metal oxide particles and side reactions between the lithium metal oxide and the electrolyte may occur. Accordingly, life-span properties (e.g., a capacity retention) of the lithium secondary battery may be deteriorated.

SUMMARY

According to an aspect of the present invention, there is provided an electrolyte solution for a lithium secondary battery having improved chemical stability.

According to an aspect of the present invention, there is provided a lithium secondary battery having improved operational reliability and chemical stability.

An electrolyte solution for a lithium secondary battery includes an organic solvent, a lithium salt, a compound represented by Chemical Formula 1 and a compound represented by Chemical Formula 2.

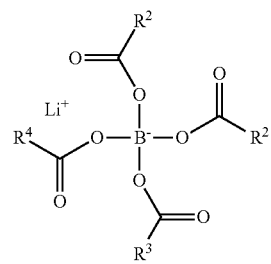

[Chemical Formula 1]

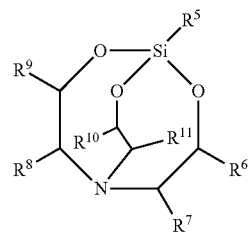

[Chemical Formula 2]

In Chemical Formula 1, $R^1$ to $R^4$ are each independently hydrogen, a C1-C6 alkyl group or a halogen-substituted C1-C6 alkyl group. In Chemical Formula 2, $R^5$ is a halogen, a C1-C6 alkyl group, a C2-C6 alkenyl group, a halogen-substituted C1-C6 alkyl group or a halogen-substituted C2-C6 alkenyl group. $R^6$ to $R^{11}$ are each independently hydrogen, halogen, a C1-C6 alkyl group, a C2-C6 alkenyl group, a halogen-substituted C1-C6 alkyl group or a halogen-substituted C2-C6 alkenyl group.

In some embodiments, $R^1$ to $R^4$ may be each independently the halogen-substituted C1-C6 alkyl group.

In some embodiments, $R^5$ may be halogen.

In some embodiments, $R^6$ to $R^{11}$ may each be hydrogen or a C1-C3 alkyl group.

In some embodiments, a total content of the compound represented by Chemical Formula 1 and the compound represented by Chemical Formula 2 may be in a range from 0.2 wt % to 10 wt % based on a total weight of the electrolyte solution.

In some embodiments, the organic solvent may include a linear carbonate-based solvent and a cyclic carbonate-based solvent.

In some embodiments, an amount of the linear carbonate-based solvent may be greater than an amount of the cyclic carbonate-based solvent based on a volume in the organic solvent.

In some embodiments, the electrolyte solution for a lithium secondary battery may further include an auxiliary additive that includes at least one selected from the group consisting of a fluorine-containing cyclic carbonate-based compound, a sultone-based compound, a cyclic sulfate-based compound, a fluorine-containing lithium phosphate-based compound and a cyclic carbonate-based compound having a double bond.

In some embodiments, a ratio of a content of the auxiliary additive relative to a total content of the compound represented by Chemical Formula 1 and the compound represented by Chemical Formula 2 in the total weight of the electrolyte may be in a range from 1 to 10.

A lithium secondary battery includes a cathode, an anode facing the cathode, and the electrolyte solution for a lithium secondary battery according to the above-described embodiments.

An electrolyte solution for a lithium secondary battery according to exemplary embodiments may provide improved low-temperature performance and high-temperature storage properties. A lithium secondary battery having improved low-temperature performance and high-temperature storage properties may be implemented using the electrolyte solution.

DETAILED DESCRIPTION OF THE EMBODIMENTS

Figure 1:
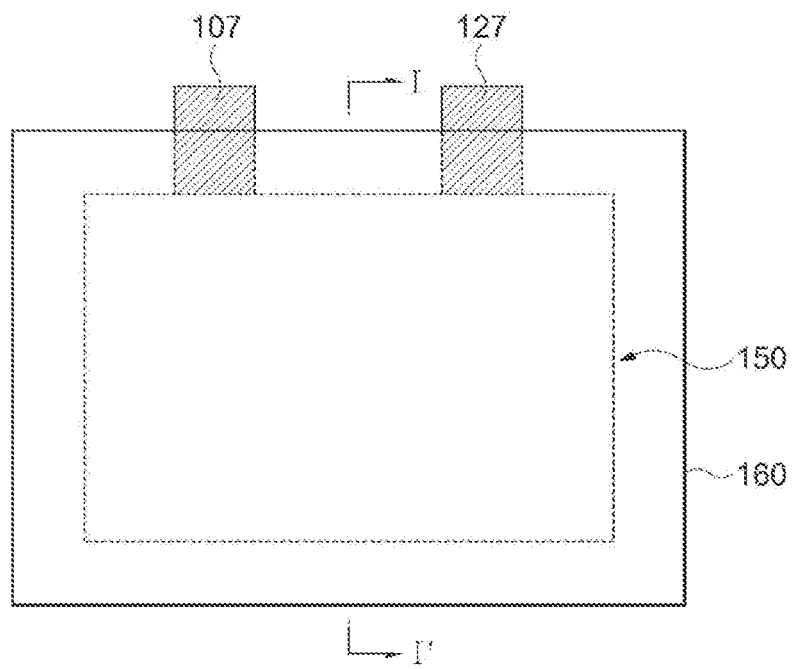
FIGS. 1 and 2 are a schematic plan view and a schematic cross-sectional view, respectively, illustrating a lithium secondary battery in accordance with exemplary embodiments.

According to embodiments of the present invention, an electrolyte solution for a lithium secondary battery including an organic solvent, a lithium salt and a compound represented by a specific chemical formula is provided. Further, a lithium secondary battery including the electrolyte solution is also provided.

The term "Ca-Cb" used herein indicates that the number of carbon atoms is from a to b. For example, "5-7 membered ring" refers to a structure having 5 to 7 atoms in a ring.

Electrolyte Solution for Lithium Secondary Battery

An electrolyte solution for a lithium secondary battery according to embodiments of the present invention includes an organic solvent, a lithium salt, a compound represented by Chemical Formula 1 and a compound represented by Chemical Formula 2 below.

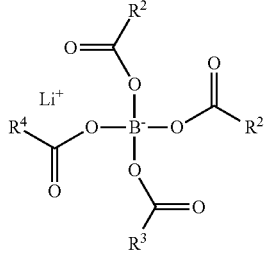

[Chemical Formula 1]

In Chemical Formula 1, $R^1$ to $R^4$ may each independently be hydrogen, a C1-C6 alkyl group, or a halogen-substituted C1-C6 alkyl group.

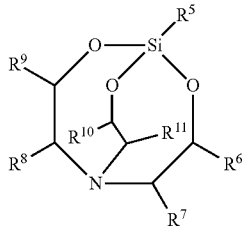

[Chemical Formula 2]

In Chemical Formula 2, $R^5$ may be a halogen, a C1-C6 alkyl group, a C2-C6 alkenyl group, a halogen-substituted C1-C6 alkyl group, or a halogen-substituted C2-C6 alkenyl group. $R^6$ to $R^{11}$ may each independently be hydrogen, halogen, a C1-C6 alkyl group, a C2-C6 alkenyl group, a halogen-substituted C1-C6 alkyl group, or a halogen-substituted C2-C6 alkenyl group.

For example, the C1-C6 alkyl group may be a C1-C6 straight chain alkyl group or a C3-C6 branched chain alkyl group. The C2-C6 alkenyl group may be a C2-C6 straight-chain alkenyl group or a C3-C6 branched chain alkenyl group.

The compounds of Chemical Formulae 1 and 2 may form a solid electrolyte interphase (SEI) having improved chemical stability on a surface of an electrode (e.g., an anode). Accordingly, life-span properties, low-temperature performance and high-temperature storage performance of the lithium secondary battery may be improved.

For example, the compounds of Chemical Formulae 1 and 2 may be included as additives.

In some embodiments, $R^1$ to $R^4$ may each independently be a halogen-substituted C1-C6 alkyl group.

In an embodiment, $R^1$ to $R^4$ may each independently be a fluorine-substituted C1-C3 alkyl group. In an embodiment, $R^1$ to $R^4$ may each independently be —$CF_3$, —$C_2F_5$ or —$C_3F_8$. In this case, low-temperature performance and high-temperature storage performance of the lithium secondary battery may be further improved.

In an embodiment, $R^1$ to $R^4$ are each fluorine-substituted C1-C3 alkyl group, and may be identical to each other.

In some embodiments, $R^5$ may be a halogen, a halogen substituted C1-C6 alkyl group or a halogen substituted C2-C6 alkenyl group.

In an embodiment, $R^5$ may be halogen (e.g., fluorine). In this case, low-temperature performance and high-temperature storage performance of the lithium secondary battery may be further improved.

In some embodiments, $R^6$ to $R^{11}$ may each independently be hydrogen or a C1-C3 alkyl group.

In an embodiment, $R^6$ to $R^{11}$ may all be hydrogen.

In an embodiment, a total content of the compounds of Chemical Formulae 1 and 2 may be in a range from 0.1 weight percent (wt %) to 20 wt %, from 0.15 wt % to 15 wt %, from 0.2 wt % to 10 wt %, from 0.25 wt % to 7.5 wt %, from 0.3 wt % to 6 wt %, from 0.5 wt % to 5 wt %, 0.75 wt % to 3.5 wt %, or 1 to 3 wt % based on a total weight of the electrolyte solution. Within the above range, low-temperature performance and high-temperature storage performance of the lithium secondary battery may be further improved.

In an embodiment, a ratio of a content of the compound of Chemical Formula 2 relative to a content of the compound of Chemical Formula 1 in the total weight of the electrolyte solution for a lithium secondary battery may be in a range from 0.2 to 5, from 0.5 to 3, or from 0.75 to 1.25. Within the above range, low-temperature performance of the lithium secondary battery may be further improved.

In an embodiment, the content of the compound of Chemical Formula 1 may be in a range from 0.1 wt % to 10 wt %, from 0.25 wt % to 7.5 wt %, from 0.3 wt % to 5 wt %, from 0.4 wt % to 4 wt %, from 0.5 wt % to 3 wt %, or from 0.5 wt % to 2 wt %. The compound of Chemical Formula 1 may be used in the amount within the above range together with the compound of Chemical Formula 2, so that high-temperature storage performance of the lithium secondary battery may be further improved.

In some embodiments, the content of the compound represented by Chemical Formula 2 may be in a range from 0.1 wt % to 10 wt %, from 0.25 wt % to 7.5 wt %, from 0.3 wt % to 5 wt %, from 0.4 wt % to 4 wt %, from 0.5 wt % to 3 wt %, or 0.5 wt % to 2 wt % based on the total weight of the electrolyte solution. The compound of Chemical Formula 2 may be used in the amount within the above range together with the compound of Chemical Formula 1, so that low-temperature performance and high-temperature storage performance of the lithium secondary battery may be further improved.

In exemplary embodiments, the electrolyte solution may further include an auxiliary additive to further improve performance (e.g., life-span properties, etc.) of the lithium secondary battery.

For example, the auxiliary additive may include a fluorine-containing cyclic carbonate-based compound, a sultone-based compound, a cyclic sulfate-based compound, a fluorine-containing lithium phosphate-based compound, a cyclic carbonate-based compound having a double bond, etc.

For example, the fluorine-containing cyclic carbonate-based compound may have a 5-7 membered cyclic structure.

For example, the fluorine-containing cyclic carbonate-based compound may include carbon to which a fluorine atom is directly bonded, or may include a fluorine-substituted alkyl group (e.g., —$CF_3$).

In some embodiments, the fluorine-containing cyclic carbonate-based compound may include fluoroethylene carbonate (FEC), etc.

In some embodiments, the sultone-based compound may include an alkyl sultone-based compound such as 1,3-propane sultone (PS) or 1,4-butane sultone; a alkenyl sultone-based compound such as ethene sultone, 1,3-propene sultone (PRS), 1,4-butene sultone, 1-methyl-1,3-propene sultone, etc.

For example, in the cyclic sulfate-based compound, at least one atom of a sulfate group may be arranged in a ring. For example, the cyclic sulfate-based compound may have a 5-7 membered cyclic structure.

In some embodiments, the cyclic sulfate-based compound may include ethylene sulfate (ESA), methyl ethylene sulfate, ethyl ethylene sulfate, 4,5-dimethyl ethylene sulfate, 4,5-diethyl ethylene sulfate, propylene sulfate, 4,5-dimethyl propylene sulfate, 4,5-diethyl propylene sulfate, 4,6-dimethyl propylene sulfate, 4,6-diethyl propylene sulfate, 1,3-butylene glycol sulfate, etc.

For example, the fluorine-containing lithium phosphate-based compound may include a phosphorus atom to which a fluorine atom is directly bonded, or an alkyl group (e.g., —$CF_3$) to which a fluorine atom is bonded.

For example, the fluorine-containing lithium phosphate-based compound may include lithium difluorophosphate ($LiPO_2F_2$), lithium tetrafluorooxalate phosphate, lithium difluoro(bisoxalato)phosphate, etc.

For example, the cyclic carbonate-based compound having a double bond may include a double bond in a ring structure.

In some embodiments, the cyclic carbonate-based compound having a double bond may include vinylene carbonate (VC), etc.

In some embodiments, a content of the auxiliary additive may be in a range from 0.1 wt % to 20 wt %, from 0.15 wt % to 15 wt %, from 0.2 wt % to 10 wt %, from 0.25 wt % to 7.5 wt %, from 0.3 wt % to 6 wt % or from 0.5 wt % to 5 wt % based on the total weight of the electrolyte solution.

In some embodiments, a ratio of an amount of the auxiliary additive relative to a total amount of the compound of Chemical Formula 1 and the compound of Chemical Formula 2 based on the total weight of the electrolyte may be in a range from 1 to 10, from 2 to 8, or from 2.5 to 6. Within the above range, effects from the auxiliary additive may be provided while maintaining the functions of the compound of Chemical Formula 1 and the compound of Chemical Formula 2.

The organic solvent may include a compound having a sufficient solubility for the lithium salt, the compound of Chemical Formula 1, the compound of Chemical Formula 2, and the auxiliary additive. In some embodiments, the organic solvent may be a non-aqueous organic solvent.

In some embodiments, the organic solvent may include a carbonate-based solvent, an ester-based solvent, an ether-based solvent, a ketone-based solvent, an alcohol-based solvent, an aprotic solvent, etc.

In an embodiment, the carbonate-based solvent may include a linear carbonate-based solvent and a cyclic carbonate-based solvent.

For example, the linear carbonate-based solvent may include dimethyl carbonate (DMC), ethyl methyl carbonate (EMC), diethyl carbonate (DEC), methyl propyl carbonate, ethyl propyl carbonate, dipropyl carbonate, etc.

For example, the cyclic carbonate-based solvent may include ethylene carbonate (EC), propylene carbonate (PC), butylene carbonate, etc.

In some embodiments, based on a volume of the organic solvent, an amount of the linear carbonate-based solvent may be greater than an amount of the cyclic carbonate-based solvent. For example, a mixing volume ratio of the linear carbonate-based solvent and the cyclic carbonate-based solvent may be from 1:1 to 9:1, or from 1.5:1 to 4:1.

For example, the ester-based solvent may include methyl acetate (MA), ethyl acetate (EA), n-propyl acetate (n-PA), 1,1-dimethylethyl acetate (DMEA), methyl propionate (MP), ethyl propionate (EP), γ-butyrolactone (GBL), decanolide, valerolactone, mevalonolactone, caprolactone, etc.

For example, the ether-based solvent may include dibutyl ether, tetraethylene glycol dimethyl ether (TEGDME), diethylene glycol dimethyl ether (DEGDME), dimethoxyethane, tetrahydrofuran (THF), 2-methyltetrahydrofuran, etc.

For example, the ketone-based solvent may include cyclohexanone, etc.

For example, the alcohol-based solvent may include ethyl alcohol, isopropyl alcohol, etc.

For example, the aprotic solvent may include a nitrile-based solvent, an amide-based solvent (e.g., dimethylformamide), a dioxolane-based solvent (e.g., 1,3-dioxolane), a sulfolane-based solvent.

In some embodiments, the lithium salt may serve as an electrolyte. For example, the lithium salt may be expressed as $Li^+X^-$.

For example, the anion $X^-$ of the lithium salt may include $F^-$, $Cl^-$, $Br^-$, $I^-$, $NO_3^-$, $N(CN)_2^-$, $BF_4^-$, $ClO_4^-$, $PF_6^-$, $SbF_6^-$, $AsF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, $(CF_3CF_2SO_2)_2N^-$, etc. These may be used alone or in a combination thereof.

In some embodiments, the lithium salt may include $LiBF_4$, $LiPF_6$, etc.

In an embodiment, the lithium salt may be included in a concentration from about 0.01 M to 5M, preferably from about 0.01 M to 2M. Within the above range, transfer of lithium ions and/or electrons may be promoted during charging and discharging of the lithium secondary battery.

Lithium Secondary Battery

Figure 2:
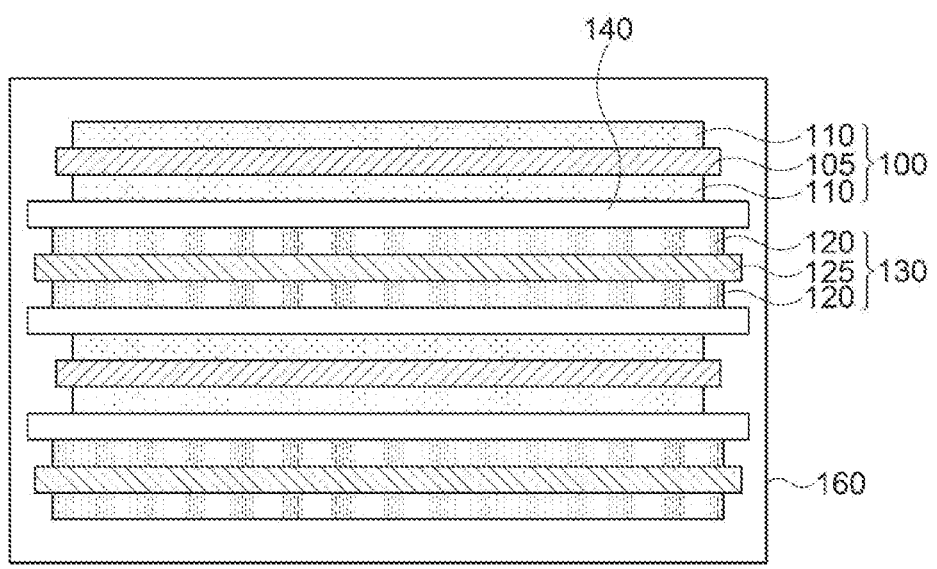

FIGS. 1 and 2 are a schematic plan view and a schematic cross-sectional view, respectively, illustrating a lithium secondary battery in accordance with exemplary embodiments.

Referring to FIGS. 1 and 2, a lithium secondary battery may include an electrode assembly including a cathode 100, an anode 130, and a separation layer 140 interposed between the cathode and the anode. FIG. 2 is a cross-sectional view taken along a line I-I' of FIG. 1.

Referring to FIGS. 1 and 2, the lithium secondary battery may include a cathode 100 and an anode 130.

The cathode 100 may include a cathode current collector 105 and a cathode active material layer 110 formed on the cathode current collector 105. For example, the cathode active material layer 110 may be formed on one surface or both surfaces of the cathode current collector 105.

For example, the cathode active material layer 110 may include a cathode active material optionally a cathode binder and a conductive material.

For example, a cathode slurry may be prepared by mixing and stirring the cathode electrode active material, the cathode binder, the conductive material, a dispersive agent, etc. The cathode slurry may be coated on the cathode current collector 105, and then dried and pressed to form the cathode 100.

For example, the cathode current collector 105 may include stainless steel, nickel, aluminum, titanium, copper or an alloy thereof, and preferably may include aluminum or an aluminum alloy.

The cathode active material may be a material capable of reversibly intercalating and de-intercalating lithium ions. For example, the cathode active material may include a lithium metal oxide containing a metal element such as nickel, cobalt, manganese, aluminum, etc.

In an embodiment, the cathode active material may include lithium metal oxide particles containing nickel.

In some embodiments, the lithium metal oxide particle may include 80 mol % or more of nickel based on a total number of moles of all elements excluding lithium and oxygen. In this case, the lithium secondary battery having a high capacity may be implemented.

In some embodiments, the lithium metal oxide particle may include 83 mol % or more, 85 mol % or more, 90 mol % or more, or 95 mol % or more of nickel based on the total number of moles of all elements except lithium and oxygen.

In some embodiments, the lithium metal oxide particle may further include at least one of cobalt and manganese. In this case, the lithium secondary battery having more improved power properties, a penetration stability, etc., may be implemented.

In some embodiments, the lithium metal oxide particle may be represented by Chemical Formula 3 below.

                        Chemical Formula 3

In Chemical Formula 3, M may include at least one of Co, Mn, Al, Zr, Ti, Cr, B, Mg, Ba, Si, Y, W and Sr, $0.9 \leq a \leq 1.2$, $0.5 \leq x \leq 0.99$, and $-0.1 \leq y \leq 0.1$.

In an embodiment, the lithium metal oxide particle may further include a doping element. For example, the doping element may include at least one of Al, Ti, Ba, Zr, Si, B, Mg, P, Sr, W and La. In this case, the lithium secondary battery having more improved life-span properties may be implemented.

In an embodiment, the lithium metal oxide particles may further include a coating element. For example, the coating element may include at least one of Al, Ti, Ba, Zr, Si, B, Mg, P, Sr, W and La. In this case, the lithium secondary battery having more improved life-span properties may be implemented.

For example, the cathode binder may include an organic based binder such as polyvinylidenefluoride (PVDF), a polyvinylidene fluoride-hexafluoropropylene copolymer (PVDF-co-HFP), polyacrylonitrile, polymethylmethacrylate, etc., or an aqueous based binder such as styrene-butadiene rubber (SBR) that may be used with a thickener such as carboxymethyl cellulose (CMC).

For example, the conductive material may include a carbon-based material such as graphite, carbon black, graphene, carbon nanotube, etc., and/or a metal-based material such as tin, tin oxide, titanium oxide, a perovskite material such as $LaSrCoO_3$ or $LaSrMnO_3$, etc.

The anode 130 may include an anode current collector 125 and an anode active material layer 120 formed on the anode current collector 125. For example, the anode active material layer 120 may be formed on one surface or both surfaces of the anode current collector 125.

For example, the anode active material layer 120 may include an anode active material optionally with an anode binder and a conductive material.

For example, an anode slurry may be prepared by mixing and stirring an anode active material, an anode binder, a conductive material, a solvent, etc. The anode slurry may be coated on the anode current collector 125, and then dried and pressed to form the anode 130.

The anode current collector 125 may include, e.g., gold, stainless steel, nickel, aluminum, titanium, copper or an alloy thereof, and preferably may include copper or a copper alloy.

The anode active material may include a material capable of adsorbing and ejecting lithium ions. For example, the anode active material may include a lithium alloy, a carbon-based material, a silicon-based material, etc.

For example, the lithium alloy may include a metal element such as aluminum, zinc, bismuth, cadmium, antimony, silicon, lead, tin, gallium, indium, etc.

For example, the carbon-based active material may include a crystalline carbon, an amorphous carbon, a carbon composite, a carbon fiber, etc.

The amorphous carbon may include, e.g., a hard carbon, coke, a mesocarbon microbead (MCMB) fired at a temperature of 1,500° C. or less, a mesophase pitch-based carbon fiber (MPCF), etc.

The crystalline carbon may include, e.g., an artificial graphite, a natural graphite, a graphitized coke, a graphitized MCMB, a graphitized MPCF, etc.

The anode active material may include the silicon-based active material. The silicon-based active material may include, e.g., silicon, $SiO_x$ ($0<x<2$), Si/C, SiO/C, Si-Metal, etc.

For example, if the anode active material includes the silicon-based active material, a thickness of the battery may be increased during repeated charging and discharging. The lithium secondary battery according to embodiments of the present invention includes the above-described electrolyte solution to reduce a thickness increase ratio of the battery.

In some embodiments, a content of silicon atoms in the anode active material may be in a range from 1 wt % to 20 wt %, from 1 wt % to 15 wt %, or from 1 wt % to 10 wt %.

The anode binder and the conductive material may include materials substantially the same as or similar to those used for the cathode. For example, the anode binder may include an aqueous binder such as styrene-butadiene rubber (SBR). The anode binder may be used together with a thickener such as carboxymethyl cellulose (CMC).

In some embodiments, an area of the anode 130 may be greater than that of the cathode 100. Thus, lithium ions generated from the cathode 100 may be easily transferred to the anode 130 without a loss by, e.g., precipitation or sedimentation.

For example, the cathode 100 and the anode 130 may be alternately and repeatedly stacked to form an electrode assembly 150.

In some embodiments, a separation layer 140 may be interposed between the anode 100 and the cathode 130. For example, the electrode assembly 150 may be formed by winding, stacking or z-folding of the separation layer 140.

The separation layer 140 may include a porous polymer film prepared from, e.g., a polyolefin-based polymer such as an ethylene homopolymer, a propylene homopolymer, an ethylene/butene copolymer, an ethylene/hexene copolymer, an ethylene/methacrylate copolymer, or the like. The separation layer 140 may also include a non-woven fabric formed from a glass fiber with a high melting point, a polyethylene terephthalate fiber, etc.

For example, the anode 100 and the cathode lead 107 may be electrically connected to each other. The cathode 130 and the cathode lead 127 may be electrically connected to each other.

For example, the cathode lead 107 may be electrically connected to the cathode current collector 105. The anode lead 130 may be electrically connected to the anode current collector 125.

For example, the cathode current collector 105 may include a protrusion (a cathode tab, not illustrated) at one side thereof. The cathode active material layer 110 may not be formed on the cathode tab. The cathode tab may be integral with the cathode current collector 105 or may be connected to the cathode current collector 105 by, e.g., welding. The cathode current collector 105 and the cathode lead 107 may be electrically connected via the cathode tab.

The anode current collector 125 may include a protrusion (an anode tab, not illustrated) at one side thereof. The anode active material layer 120 may not be formed on the anode tab. The anode tab may be integral with the anode current collector 125 or may be connected to the anode current collector 125 by, e.g., welding. The anode electrode current collector 125 and the anode lead 127 may be electrically connected via the anode tab.

For example, the electrode assembly 150 may include a plurality of the cathodes and a plurality of the anodes. For example, a plurality of the cathodes and the anodes may be alternately disposed, and the separation layer may be interposed between the cathode and the anode. Accordingly, the lithium secondary battery according to an embodiment of the present invention may include a plurality of the cathode tabs and a plurality of the anode tabs protruding from each of the plurality of the cathodes and the plurality of the anodes.

The cathode tabs (or the anode tabs) may be laminated, compressed, and welded to form a cathode tab stack (or an anode tab stack). The cathode tab stack may be electrically connected to the cathode lead 107. The anode tab stack may be electrically connected to the anode lead 127.

The electrode assembly 150 may be accommodated together with the electrolyte solution according to the above-described embodiments of the present invention in a case 160 to define the lithium secondary battery.

The lithium secondary battery may be manufactured in, e.g., a cylindrical shape using a can, a square shape, a pouch shape or a coin shape.

Hereinafter, preferred embodiments are proposed to more concretely describe the present invention. However, the following examples are only given for illustrating the present invention and those skilled in the related art will obviously understand that various alterations and modifications are possible within the scope and spirit of the present invention. Such alterations and modifications are duly included in the appended claims.

Examples and Comparative Examples (1) Preparation of Electrolyte Solution for Lithium Secondary Battery A 1.0 M LiPF6 solution was prepared using a mixed solvent of ethylene carbonate (EC), ethyl methyl carbonate (EMC) and diethyl carbonate (DEC) at a ratio of 25:45:30 (v/v/v).

Electrolyte solutions of Examples and Comparative Examples were prepared by adding and mixing a borate-based compound, a silatrane-based compound and an auxiliary additives in contents (wt %) shown in Table 1 below in the $LiPF_6$ solution based on a total weight of the electrolyte solution.

(2) Fabrication of Lithium Secondary Battery

A cathode slurry was prepared by dispersing $Li[Ni_{0.8}Co_{0.1}Mn_{0.1}]O_2$ as a cathode active material, carbon black and polyvinylidene fluoride (PVDF) in NMP in a weight ratio of 98:1:1.

The cathode slurry was coated on an area except for a protrusion of an aluminum foil having the protrusion (a cathode tab) at one side, and dried and pressed to prepare form a cathode.

An anode active material including Si/C and graphite in a weight ratio of 15:85, styrene-butadiene rubber (SBR) and carboxymethyl cellulose (CMC) were mixed in water in a weight ratio of 97:1:2 to form an anode slurry.

The anode slurry was uniformly coated on an area except for a protrusion of a copper foil having the protrusion (an anode tab) on one side, and dried and pressed to form an anode.

An electrode assembly was formed by interposing a polyethylene separator (thickness of 13 μm) between the cathode and the anode. A cathode lead and an anode lead were connected to the cathode tab and the anode tab by welding, respectively.

The electrode assembly was accommodated in a pouch so that partial regions of the cathode lead and the anode lead were exposed to an outside, and three sides except for an electrolyte injection side were sealed.

The electrolyte solution prepared according to the above (1) was injected into the pouch and the electrolyte injection side was sealed to prepare a lithium secondary battery sample.

TABLE 1

| No. | lithium borate-based compound (A) | silatrane-based compound (B) | auxiliary additive (C) | | | | |
|---|---|---|---|---|---|---|---|
| | | | LiPO$_2$F$_2$ | FEC | PS | PRS | ESA |
| Example 1 | 0.5 | 0.5 | 1.0 | 3.0 | 0.5 | 0.5 | 0.5 |
| Example 2 | 0.5 | 1.0 | 1.0 | 3.0 | 0.5 | 0.5 | 0.5 |
| Example 3 | 1.0 | 0.5 | 1.0 | 3.0 | 0.5 | 0.5 | 0.5 |
| Example 4 | 1.0 | 1.0 | 1.0 | 3.0 | 0.5 | 0.5 | 0.5 |
| Comparative Example 1 | — | — | 1.0 | 3.0 | 0.5 | 0.5 | 0.5 |
| Comparative Example 2 | 1.0 | — | 1.0 | 3.0 | 0.5 | 0.5 | 0.5 |
| Comparative Example 3 | — | 1.0 | 1.0 | 3.0 | 0.5 | 0.5 | 0.5 |

The components shown in Table 1 are as follows.

Lithium Borate-Based Compound (A): a Compound Represented by Chemical Formula 1-1

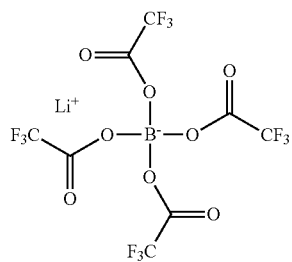

[Chemical Formula 1-1]

Silatrane-Based Compound (B): a Compound Represented by Chemical Formula 2-1

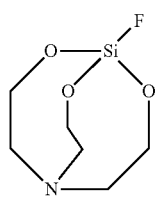

[Chemical Formula 2-1]

Auxiliary Additive (C)
LiPO$_2$F$_2$: lithium difluorophosphate
FEC: fluoro Ethylene Carbonate
PS: 1,3-propane sultone
PRS: 1,3-propene sultone
ESA: ethylene sulfate Experimental Example 1. Evaluation on Low Temperature Performance (1) Evaluation on Low Temperature Capacity The lithium secondary batteries of Examples and Comparative Examples were repeatedly charged (CC-CV 0.5 C 4.2V 0.05 C CUT-OFF) and discharged (CC 0.5 C 3.0V CUT-OFF) 3 times at −10° C., and then a discharge capacity at the 3rd cycle was measured.

As shown in Equation 1-1 below, based on Comparative Example 1, discharge capacity change ratios in Examples 1 to 4 and Comparative Examples 2 and 3 were calculated.

Discharge capacity change ratio (%)=[(discharge capacity of Example or Comparative Example−discharge capacity of Comparative Example 1)/Discharge capacity of Comparative Example 1]×100 [Equation 1-1]

(2) Evaluation on Low-Temperature DCIR

Lithium secondary batteries of Examples and Comparative Examples were charged to a point of 60% SOC (State of Charge).

At the SOC 60% point, he batteries were discharged and supplementarily charged for 10 seconds while changing a C-rate to 0.2 C, 0.5 C, 1.0 C, 1.5 C, 2.0 C, and 2.5 C. Voltages during the discharging and supplementary charging were plotted, and a slope was adopted as DCIR.

As shown in Equation 1-2 below, based on Comparative Example 1, DCIR change ratios of Examples 1 to 4 and Comparative Examples 2 and 3 were calculated.

DCIR change ratio (%)=[(DCIR of Example or Comparative Example−DCIR of Comparative Example 1)/DCIR of Comparative Example 1]×100 [Equation 1-2]

2. Evaluation on High-temperature Storage Performance (Evaluation on Battery Thickness Increase Ratio)

The lithium secondary batteries of Examples and Comparative Examples were charged under a condition of 0.5 C CC/CV at 25° C. (4.2V 0.05 C CUT-OFF), and then a battery thickness T1 was measured.

The charged lithium secondary batteries of Examples and Comparative Examples were left at 60° C. in an air for 12 weeks, and then a battery thickness T2 was measured.

The battery thickness was measured using a plate thickness measuring device (Mitutoyo Co., Ltd., 543-490B). A thickness change ratio was calculated according to Equation 2-1 below.

thickness change ratio (%)=(T2−T1)/T1×100(%) [Equation 2-1]

As shown in Equation 2-2 below, based on Comparative Example 1, relative thickness change ratio of Examples 1 to 4 and Comparative Examples 2 and 3 was calculated.

relative thickness change ratio (%)=[(thickness change ratio of Example or Comparative Example−thickness change ratio of Comparative Example 1)/thickness change ratio of Comparative Example 1]×100 [Equation 2-2]

TABLE 2

| No. | capacity change ratio at low temperature (%) | DCIR change ratio at low temperature (%) | relative thickness change ratio at high temperature (%) |
|---|---|---|---|
| Example 1 | +0.7 | −1.8 | −27.6 |
| Example 2 | +0.1 | −1.9 | −31.1 |
| Example 3 | +0.1 | −1.1 | −24.6 |
| Example 4 | +2.2 | −1.9 | −31.3 |

TABLE 2-continued

| No. | capacity change ratio at low temperature (%) | DCIR change ratio at low temperature (%) | relative thickness change ratio at high temperature (%) |
|---|---|---|---|
| Comparative Example 1 | +0.0 | +0.0 | +0.0 |
| Comparative Example 2 | +6.6 | −4.2 | −10.6 |
| Comparative Example 3 | −10.9 | −0.5 | −33.4 |

Referring to Table 2, the lithium secondary batteries of Examples included both the compound of Chemical Formula 1-1 and the compound of Chemical Formula 2-1, and provided enhanced low-temperature performance and high-temperature storage performance compared to those from the lithium secondary battery of Comparative Example 1.

In Comparative Example 2 where the compound of Chemical Formula 1-1 was used, but the compound of Chemical Formula 2-1 was not used, high-temperature storage property of the lithium secondary battery was deteriorated.

In Comparative Example 3 where the compound of Chemical Formula 2-1 but the compound of Chemical Formula 1-1 was not used, the low-temperature performance of the lithium secondary battery was rather deteriorated.

What is claimed is:

1. An electrolyte solution for a lithium secondary battery, comprising:
    an organic solvent;
    a lithium salt;
    a compound represented by Chemical Formula 1; and
    a compound represented by Chemical Formula 2:

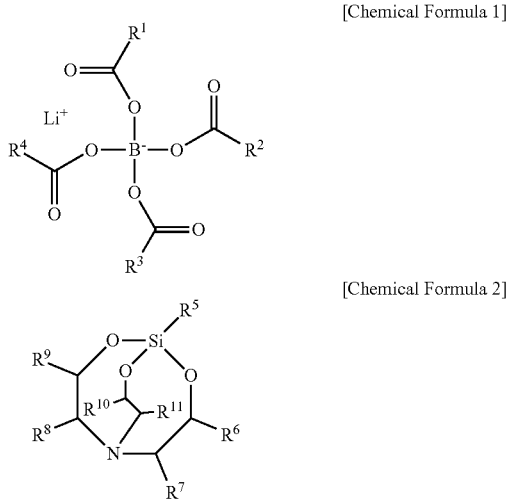

[Chemical Formula 1]

[Chemical Formula 2]

wherein, in Chemical Formula 1, $R^1$ to $R^4$ are each independently hydrogen, a C1-C6 alkyl group or a halogen-substituted C1-C6 alkyl group, wherein in Chemical Formula 2, $R^5$ is a halogen, a C1-C6 alkyl group, a C2-C6 alkenyl group, a halogen-substituted C1-C6 alkyl group or a halogen-substituted C2-C6 alkenyl group, and $R^6$ to $R^{11}$ are each independently hydrogen, halogen, a C1-C6 alkyl group, a C2-C6 alkenyl group, a halogen-substituted C1-C6 alkyl group or a halogen-substituted C2-C6 alkenyl group, wherein a total content of the compound represented by Chemical Formula 1 and the compound represented by Chemical Formula 2 is in a range from 0.1 wt % to 20 wt % based on a total weight of the electrolyte solution.

2. The electrolyte solution for a lithium secondary battery of claim 1, wherein $R^1$ to $R^4$ are each independently the halogen-substituted C1-C6 alkyl group.

3. The electrolyte solution for a lithium secondary battery of claim 1, wherein $R^5$ is halogen.

4. The electrolyte solution for a lithium secondary battery of claim 1, wherein $R^6$ to $R^{11}$ are each hydrogen or a C1-C3 alkyl group.

5. The electrolyte solution for a lithium secondary battery of claim 1, wherein the total content of the compound represented by Chemical Formula 1 and the compound represented by Chemical Formula 2 is in a range from 0.2 wt % to 10 wt % based on the total weight of the electrolyte solution.

6. The electrolyte solution for a lithium secondary battery of claim 1, wherein the organic solvent comprises a linear carbonate-based solvent and a cyclic carbonate-based solvent.

7. The electrolyte solution for a lithium secondary battery of claim 6, wherein an amount of the linear carbonate-based solvent is greater than an amount of the cyclic carbonate-based solvent based on a volume in the organic solvent.

8. The electrolyte solution for a lithium secondary battery of claim 1, further comprising an auxiliary additive that includes at least one selected from the group consisting of a fluorine-containing cyclic carbonate-based compound, a sultone-based compound, a cyclic sulfate-based compound, a fluorine-containing lithium phosphate-based compound and a cyclic carbonate-based compound having a double bond,
    wherein a content of the auxiliary additive is in a range from 0.1 wt % to 20 wt % based on the total weight of the electrolyte solution.

9. The electrolyte solution for a lithium secondary battery of claim 8, wherein the ratio of a content of the auxiliary additive relative to the total content of the compound represented by Chemical Formula 1 and the compound represented by Chemical Formula 2 in the total weight of the electrolyte is in a range from 1 to 10.

10. A lithium secondary battery, comprising:
    a cathode;
    an anode facing the cathode; and
    the electrolyte solution for a lithium secondary battery of claim 1.

* * * * *